United States Patent
Suzuki et al.

(10) Patent No.: US 8,823,864 B2
(45) Date of Patent: Sep. 2, 2014

(54) IMAGE CAPTURING APPARATUS AND ASSOCIATED METHODOLOGY FOR AUTO-FOCUS AND FACIAL DETECTION

(75) Inventors: Yasufumi Suzuki, Tokyo (JP); Masahiko Minagawa, Saitama (JP); Ryo Ochi, Kanagawa (JP)

(73) Assignee: Sony Corporation, Tokyo (JP)

( * ) Notice: Subject to any disclaimer, the term of this patent is extended or adjusted under 35 U.S.C. 154(b) by 578 days.

(21) Appl. No.: 12/146,828

(22) Filed: Jun. 26, 2008

(65) Prior Publication Data

US 2009/0002516 A1 Jan. 1, 2009

(30) Foreign Application Priority Data

Jun. 28, 2007 (JP) .................................. 2007-171250

(51) Int. Cl.
- *G03B 13/00* (2006.01)
- *H04N 5/235* (2006.01)
- *H04N 5/232* (2006.01)
- *H04N 5/222* (2006.01)

(52) U.S. Cl.
CPC ........... *H04N 5/23212* (2013.01); *H04N 5/235* (2013.01); *H04N 5/23219* (2013.01)
USPC ........................ 348/346; 348/333.02; 348/349

(58) Field of Classification Search
USPC ............................... 348/349–350, 346, 333.02
See application file for complete search history.

(56) References Cited

U.S. PATENT DOCUMENTS

| | | | |
|---|---|---|---|
| 6,035,074 A | 3/2000 | Fujimoto et al. | |
| 6,919,927 B1 * | 7/2005 | Hyodo | 348/333.02 |
| 7,136,581 B2 * | 11/2006 | Fujii | 396/54 |
| 7,161,619 B1 * | 1/2007 | Niida et al. | 348/207.11 |
| 7,652,695 B2 * | 1/2010 | Halpern | 348/239 |
| 7,672,580 B2 * | 3/2010 | Saga | 396/128 |
| 7,734,098 B2 * | 6/2010 | Kikkawa et al. | 382/195 |
| 7,781,710 B2 * | 8/2010 | Higashino | 250/201.2 |
| 7,783,186 B2 * | 8/2010 | Ishiwata et al. | 396/123 |
| 7,787,025 B2 * | 8/2010 | Sanno et al. | 348/231.3 |

(Continued)

FOREIGN PATENT DOCUMENTS

| | | |
|---|---|---|
| CN | 1716078 A | 1/2006 |
| CN | 1917585 A | 2/2007 |

(Continued)

OTHER PUBLICATIONS

U.S. Appl. No. 12/601,838, filed Nov. 25, 2009, Suzuki, et al.

(Continued)

*Primary Examiner* — Ngoc-Yen Vu

(74) *Attorney, Agent, or Firm* — Oblon, Spivak, McClelland, Maier & Neustadt, L.L.P.

(57) ABSTRACT

An image capturing apparatus includes an image capturing unit configured to capture an image of a subject to obtain an image signal; a display unit configured to display an image based on the image signal and a specific index; an instruction-receiving unit configured to receive a specific instruction; and a control unit configured to perform control such that, in a case where a specific mode is set, when an auto-focus point is designated using the instruction-receiving unit, it is determined whether the face of a subject is located at the auto-focus point, and then if it is determined that the face of the subject is located at the auto-focus point, auto-focusing, auto-exposure, and auto-white-balance suitable for the position of the face are performed.

15 Claims, 6 Drawing Sheets

(56) References Cited

U.S. PATENT DOCUMENTS

| | | | |
|---|---|---|---|
| 7,881,600 B2* | 2/2011 | Okamoto | 396/121 |
| 7,889,891 B2* | 2/2011 | Tsukiji et al. | 382/118 |
| 7,990,429 B2* | 8/2011 | Saito | 348/222.1 |
| 8,194,173 B2* | 6/2012 | Kawahara et al. | 348/345 |
| 2002/0080257 A1* | 6/2002 | Blank | 348/345 |
| 2003/0071908 A1 | 4/2003 | Sannoh et al. | |
| 2006/0012702 A1* | 1/2006 | Kawahara et al. | 348/345 |
| 2006/0028576 A1 | 2/2006 | Ito | |
| 2006/0182433 A1* | 8/2006 | Kawahara et al. | 396/123 |
| 2006/0210264 A1 | 9/2006 | Saga | |
| 2007/0025714 A1 | 2/2007 | Shiraki | |
| 2009/0066815 A1* | 3/2009 | Nozaki et al. | 348/231.99 |

FOREIGN PATENT DOCUMENTS

| | | |
|---|---|---|
| EP | 1 471 455 A2 | 10/2004 |
| JP | 10-039799 | 2/1998 |
| JP | 2000-356708 | 12/2000 |
| JP | 2001-216515 | 8/2001 |
| JP | 2002-162507 | 6/2002 |
| JP | 2002-169110 | 6/2002 |
| JP | 2002-330331 | 11/2002 |
| JP | 2006-279252 | 10/2006 |
| JP | 2007-74141 | 3/2007 |
| JP | 2007-81732 | 3/2007 |
| JP | 2007-104235 | 4/2007 |
| WO | WO 02/09024 A1 | 1/2002 |

OTHER PUBLICATIONS

English Language Translation of Office Action mailed on Jan. 8, 2010, in Chinese Patent Application No. 200810127609.X, filed Jun. 30, 2008.

* cited by examiner

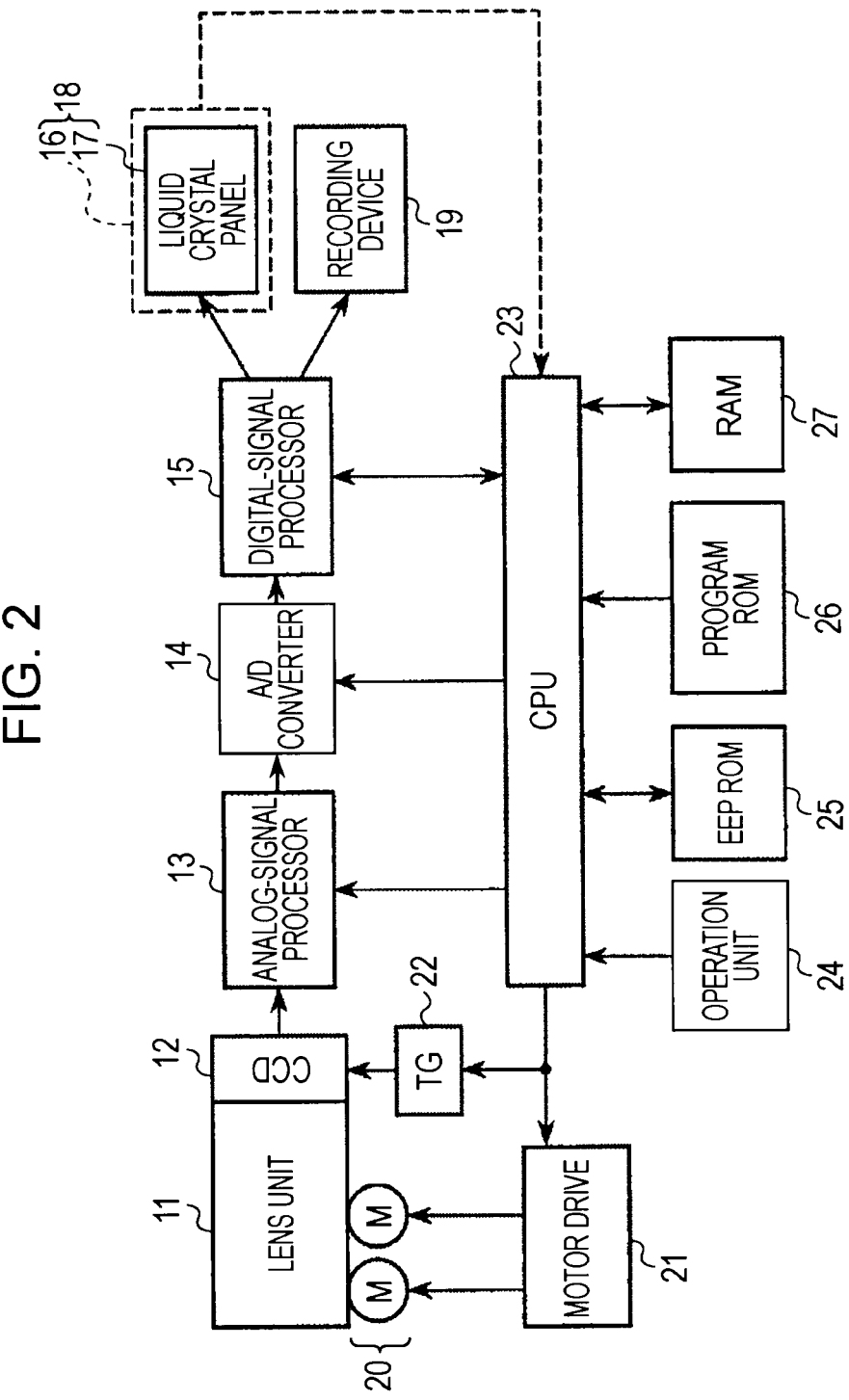

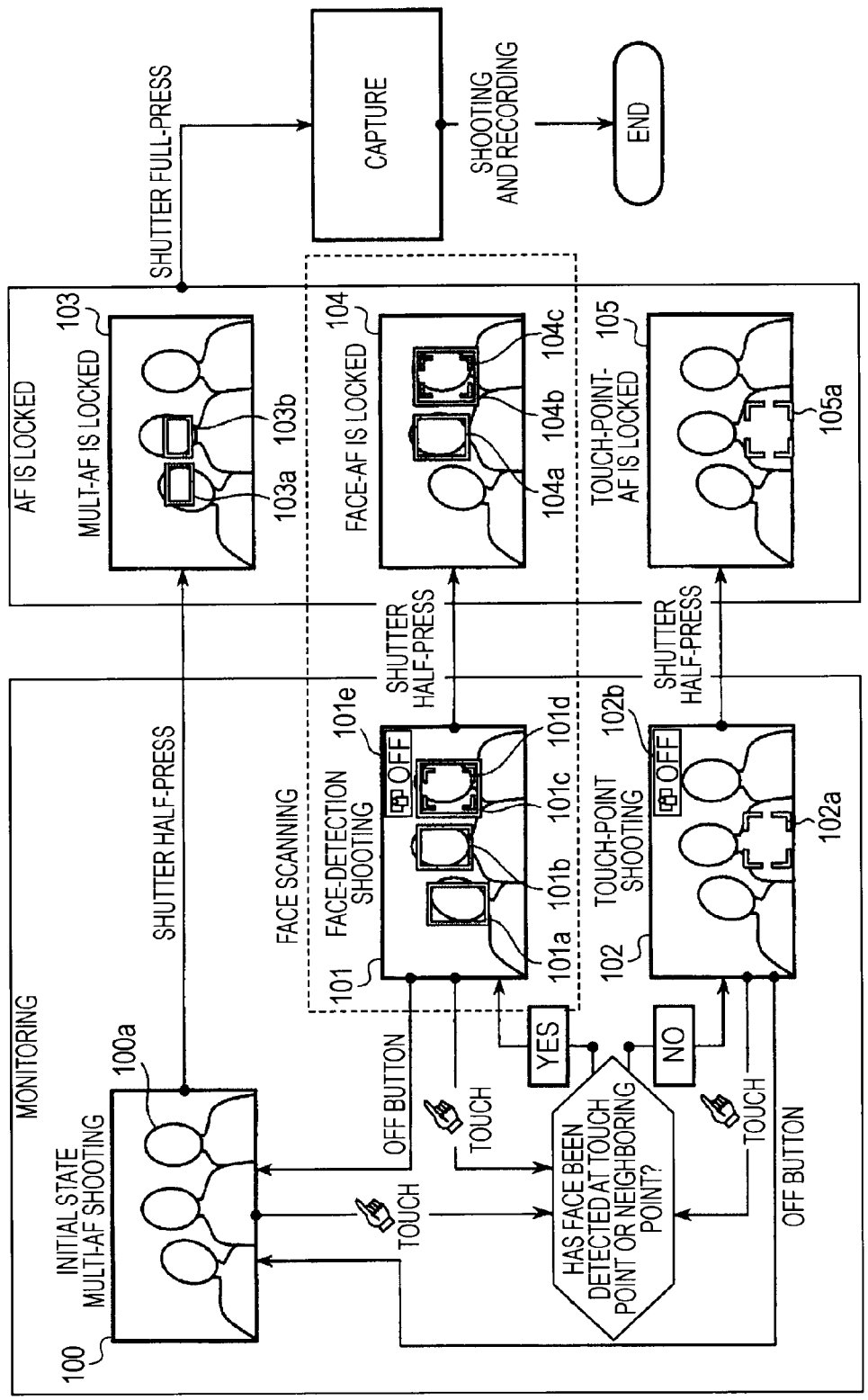

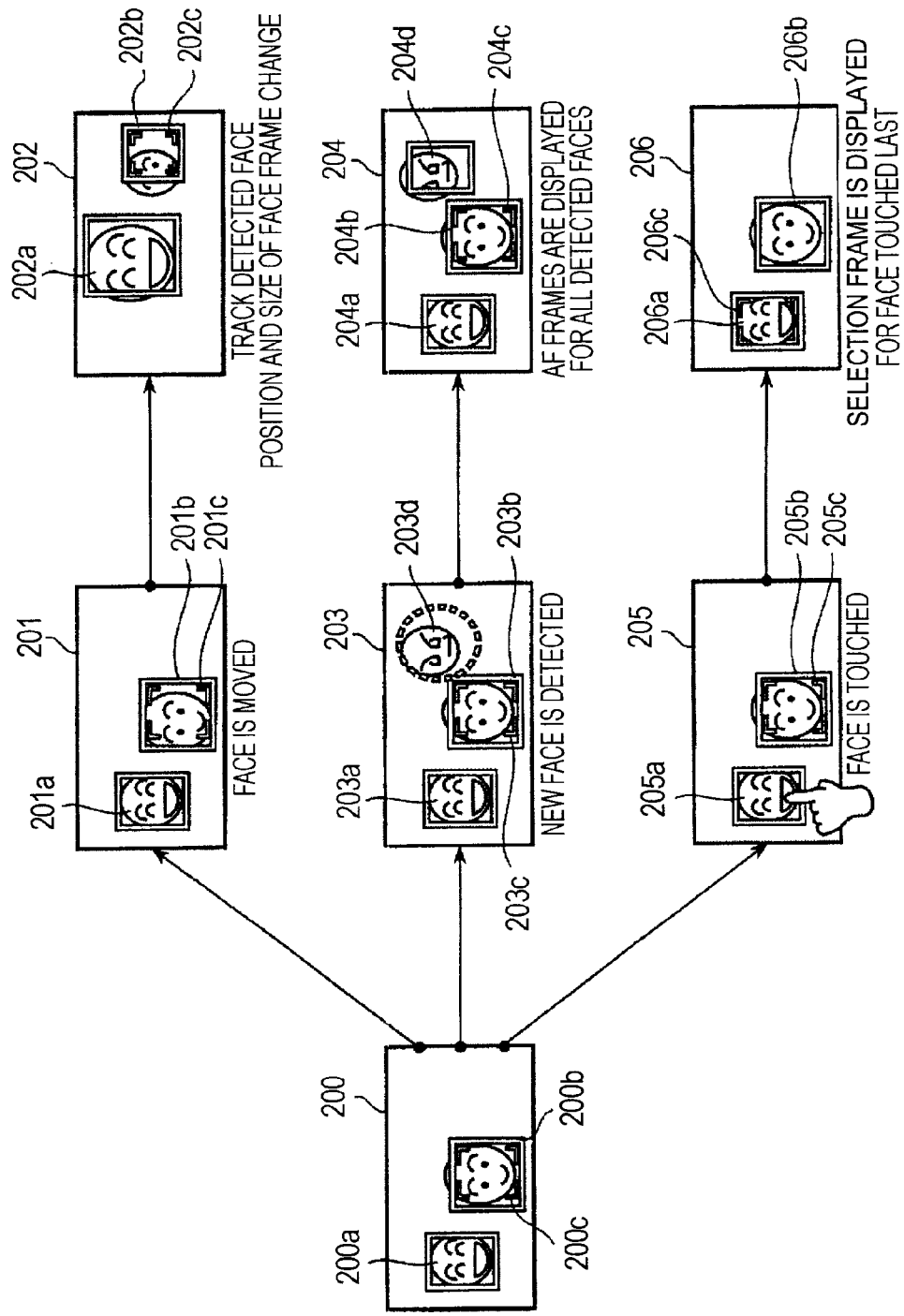

IMAGE CAPTURING APPARATUS AND ASSOCIATED METHODOLOGY FOR AUTO-FOCUS AND FACIAL DETECTION

CROSS REFERENCES TO RELATED APPLICATIONS

The present invention contains subject matter related to Japanese Patent Application JP 2007-171250 filed in the Japanese Patent Office on Jun. 28, 2007, the entire contents of which are incorporated herein by reference.

BACKGROUND OF THE INVENTION

1. Field of the Invention

The present invention relates to image capturing apparatuses, such as digital still cameras, and more particularly, to an image capturing apparatus, a shooting control method, and a program for detecting the face of a subject and performing suitable shooting control including auto-focusing (AF), auto-exposure (AE), and auto-white-balance (AWB).

2. Description of the Related Art

Image capturing apparatuses, such as digital still cameras and digital video cameras, have an AF function. With the AF function, a subject is automatically focused upon. In general, an image of a subject is captured using an image capturing device, such as a charge-coupled device (CCD) or a complementary metal-oxide semiconductor (CMOS) device. In addition, a focus position is often automatically determined on the basis of the contrast of the captured image. Nowadays, in order to set the position of a desired point in an image to be focused upon, spot AF, by which a desired AF point within a specific AF detectable frame can be set, is also available. In the case that a spot AF mode is set as a shooting mode, a user selects a desired AF point within an AF detectable frame and issues a specific instruction to set the AF point on the screen. Then, a normal shooting operation is performed.

In addition, nowadays, detection of whether the face of a subject is located at a set AF point within a specific AF detectable frame, that is, so-called face detection can be performed.

As a technique of this type, an image capturing apparatus that performs high-quality image shooting under shooting control that is adapted for a particular subject to be shot is described, for example, in Japanese Unexamined Patent Application Publication No. 2007-104235.

That is, with the above-mentioned technique, an image capturing apparatus continuously performs shooting control that is adapted for a particular subject to be shot, such as the face of a human being, even in a case where the subject to be shot temporarily disappears from a photographic image to be captured due to a shield such as a wall.

SUMMARY OF THE INVENTION

In the case that the face of a subject or the like is detected at an AF point, in order to clearly reproduce the face as an image, AF, AE, and AWB are necessary. However, according to the technology of the related art, shooting control including AF, AE, and AWB is not particularly changed depending on whether so-called spot AF is set or a face is detected at an AF point.

It is desirable to perform, in the case that an AF point is set, high-quality image capturing by changing various types of shooting control including AF, AE, and AWB on the basis of a result of determination of whether a face is detected at the AF point.

An image capturing apparatus according to a first embodiment of the present invention includes image capturing means for capturing an image of a subject to obtain an image signal, display means for displaying an image based on the image signal and a specific index, instruction-receiving means for receiving a specific instruction, and control means for performing control such that, in a case where a specific mode is set, when an auto-focus point is designated using the instruction-receiving means, it is determined whether the face of a subject is located at the auto-focus point, and then if it is determined that the face of the subject is located at the auto-focus point, auto-focusing, auto-exposure, and auto-white-balance suitable for the position of the face are performed.

Thus, in the case that an AF point is set, the control means changes various types of shooting control including AF, AE, and AWB on the basis of a result of determination of whether a face is detected at the AF point.

Even after determining whether the face of the subject is located at the auto-focus point, the control means may continue to detect the position of the face and whether a new face is present. In addition, even after determining whether the face of the subject is located at the auto-focus point, the designated auto-focus point can be changed in accordance with an instruction received by the instruction-receiving means.

A shooting control method according to a second embodiment of the present invention includes the steps of capturing, with image capturing means, an image of a subject to obtain an image signal; determining, with control means, whether a specific mode is set; receiving, with instruction-receiving means, an instruction for designating an auto-focus point; and performing, with the control means, control such that, it is determined whether the face of a subject is located at the auto-focus point, and if it is determined that the face of the subject is located at the auto-focus point, auto-focusing, auto-exposure, and auto-white-balance suitable for the position of the face are performed.

Thus, in the case that an AF point is set, accurate shooting control can be performed by changing various types of shooting control including AF, AE, and AWB on the basis of a result of determination of whether a face is detected at the AF point.

A program according to a third embodiment of the present invention causes a computer to serve as auto-focus-point setting means for setting an auto-focus point in accordance with an instruction using instruction-receiving means for designating an auto-focus point; face detection means for determining whether the face of a subject is located at the auto-focus point set by the auto-focus-point setting means; and shooting-control changing means for changing shooting control on the basis of a result of the determination.

Thus, in the case that an AF point is set, various types of shooting control including AF, AE, and AWB can be performed on the basis of a result of determination of whether a face is detected at the AF point in accordance with software processing based on the program.

According to an embodiment of the present invention, an image capturing apparatus, an image display control method, and a program attaining, in the case that an AF point is set, high-quality image capturing by changing various types of shooting control including AF, AE, and AWB on the basis of a result of determination of whether a face is detected at the AF point can be provided.

BRIEF DESCRIPTION OF THE DRAWINGS

FIG. 2 is a block diagram schematically showing the configuration of an image capturing apparatus according to a second embodiment of the present invention;

FIG. 5 is a conceptual illustration showing transition of screens and explaining the characteristic process to be performed by the image capturing apparatus according to the second embodiment; and FIG. 6 is illustration showing transition of screens and explaining features of face detection.

DESCRIPTION OF THE PREFERRED EMBODIMENTS

Preferred embodiments (hereinafter, simply referred to as embodiments) of the present invention will be described with reference to the drawings.

Figure 1:
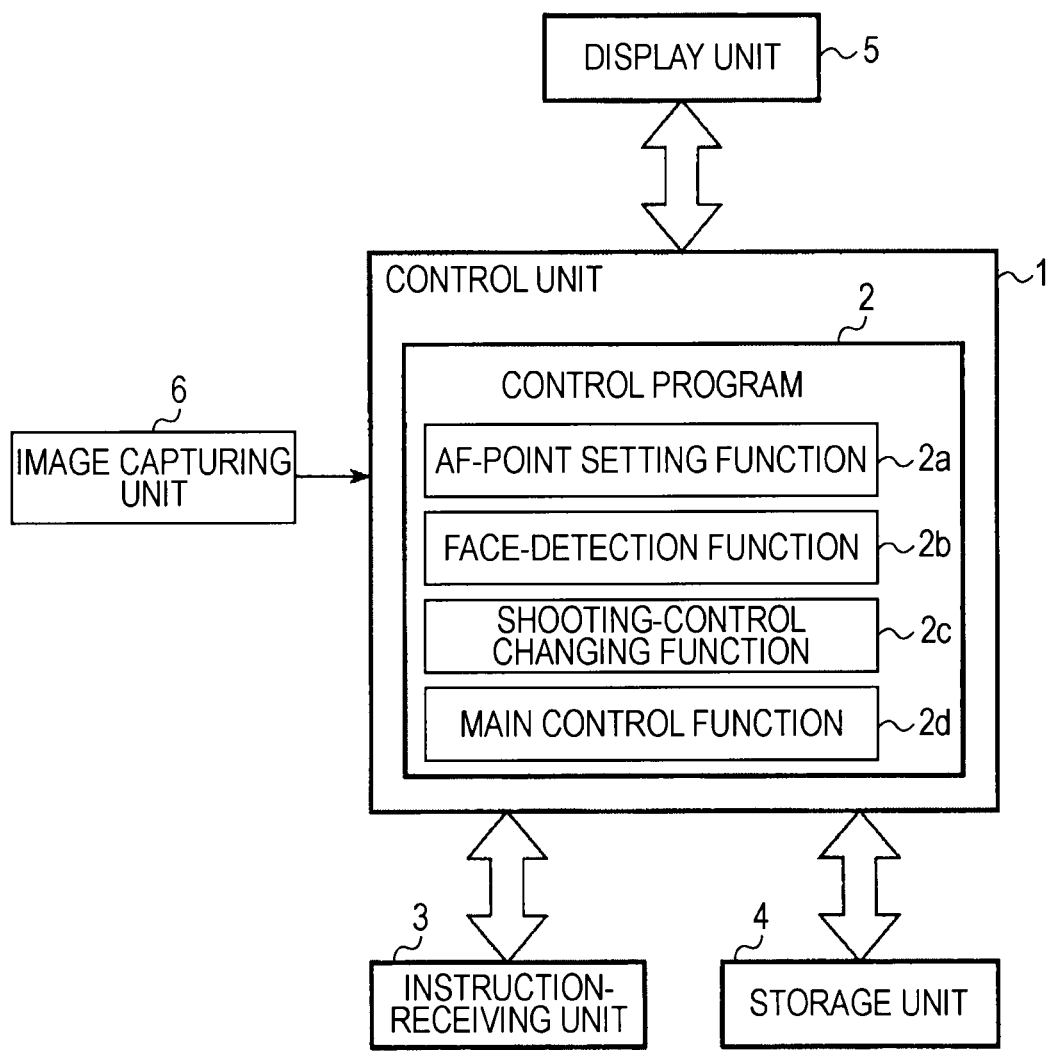
FIG. 1 is a block diagram schematically showing the configuration of an image capturing apparatus according to a first embodiment of the present invention.

FIG. 1 is a block diagram showing the configuration of an image capturing apparatus according to a first embodiment of the present invention.

As shown in FIG. 1, the image capturing apparatus according to the first embodiment includes a control unit 1 configured to control the entire apparatus, an instruction-receiving unit 3, a storage unit 4, a display unit 5, and an image capturing unit 6.

The control unit 1 implements an AF-point setting function 2a, a face-detection function 2b, a shooting-control changing function 2c, and a main control function 2d when the control unit 1 reads and executes a control program 2 stored in the storage unit 4. When the control unit 1 implements the functions 2a to 2d, the control unit 1 serves as an AF-point setting unit, a face-detection unit, a shooting-control changing unit, and a main control unit.

With the above-described configuration, the control unit 1 determines, using the main control function 2d, the mode set for the image capturing apparatus. The image capturing apparatus has a manual shooting mode and an automatic shooting mode, which includes a multi-AF mode and a spot-AF mode.

In the case that the instruction-receiving unit 3 is operated and an AF point is selected on the screen, the control unit 1 sets, using the AF-point setting function 2a, the selected AF point and determines, using the face-detection function 2b, whether a face exists in a rectangular AF frame, which represents an index of the set AF point. On the basis of the result of the determination, shooting control is changed using the shooting-control changing function 2c. In this embodiment, in the case that a face is detected, the control unit 1 performs shooting control including AF, AE, and AWB. In contrast, in the case that a face is not detected, the control unit 1 performs control such that a spot-AF operation is performed on the set AF point.

Accordingly, the control unit 1 performs the above-described shooting control and then captures an image using the image capturing unit 6 in response to depress of a release button, which is conceptually contained in the instruction-receiving unit 3. After that, the control unit 1 performs various types of image processing, and then performs control such that image data based on the captured image is stored in a medium, which is conceptually contained in the storage unit 4.

As a method for detecting the face of a subject, for example, a method for preparing an average face image in the form of a template in advance and performing matching between a received image and the image contained in the template can be adopted. Thus, the description of the method for detecting the face of a subject will be omitted.

As described above, the image capturing apparatus according to the first embodiment is capable of properly changing shooting control on the basis of a result of face detection. Thus, not only face detection but also, in the case that a face is detected, shooting control suitable for image capturing of the detected face can be performed. Thus, a high-quality image can be obtained.

A second embodiment of the present invention will now be described.

FIG. 2 is a block diagram showing the configuration of an image capturing apparatus according to the second embodiment.

The configuration shown in FIG. 2 is a further exemplifying embodiment of the image capturing apparatus according to the first embodiment described above.

As shown in FIG. 2, the image capturing apparatus according to the second embodiment includes a lens unit 11, which conceptually contains a taking lens, a diaphragm, and a focus lens. An image capturing device 12, such as a CCD, is provided in an optical path of subject light that is incident through the lens unit 11. An output from the image capturing device 12 is connected to an input of a digital-signal processor 15 through an analog-signal processor 13 and an analog-to-digital (A/D) converter 14. An output from the digital-signal processor 15 is electrically connected to an input of a liquid crystal panel 17 and an input of a recording device 19.

An actuator 20 for adjusting the diaphragm constituting the lens unit 11 and moving the focus lens constituting the lens unit 11 is mechanically connected to the lens unit 11. The actuator 20 is also connected to a motor driver 21 for controlling driving of the actuator 20.

The image capturing apparatus also includes a central processing unit (CPU) 23 configured to control the entire apparatus. The CPU 23 is connected to the motor driver 21, a timing generator (TG) 22, an operation unit 24, an electrically erasable programmable read-only memory (EEPROM) 25, a program read-only memory (ROM) 26, a random-access memory (RAM) 27, and a touch panel 16.

The CPU 23 serves as a control unit, in particular, an AF-point setting unit, a face-detection unit, a shooting-control changing unit, and a main control unit when the CPU 23 reads and executes a control program stored in the program ROM 26.

The touch panel 16 and the liquid crystal panel 17 constitute a touch screen 18.

The recording device 19 is, for example, a disc, such as a digital versatile disc (DVD), a semiconductor memory, such as a memory card, or other types of removable recording media. The recording device 19 can be installed in and removed from the image capturing apparatus. The EEPROM 25 is configured to store set various types of information and data or the like to be stored even after the power is turned off. The program ROM 26 is configured to store a program to be performed by the CPU 23 and data necessary for the execution of the program. The RAM 27 is configured to serve as a work area when the CPU 23 performs various types of processing and to temporarily store necessary program and data.

With this configuration, the CPU 23 controls each unit constituting the image capturing apparatus by executing a program recorded in the program ROM 26, and performs specific processing in accordance with a signal from the touch panel 16 and a signal from the operation unit 24. The operation unit 24 supplies a signal to the CPU 23 in accordance with an instruction issued by the user.

That is, when a desired position of the touch panel 16 is pressed, for example, by touching with a finger, that is, when a specific instruction is issued by the user, the coordinates of the pressed position are detected by the touch panel 16 and a signal corresponding to the coordinates is transmitted to the CPU 23. The CPU 23 acquires specific information corresponding to the coordinates and performs specific processing on the basis of the acquired information.

When subject light is incident through the lens unit 11, the image capturing device 12 captures the subject light. The image capturing device 12 performs photoelectric conversion of the subject light, and outputs the obtained analog image signal. At this time, the motor driver 21 drives the actuator 20 under the control of the CPU 23. With the driving of the actuator 20, the lens unit 11 is exposed from or housed in the casing of the image capturing apparatus. In addition, with the driving of the actuator 20, adjustment of the diaphragm constituting the lens unit 11 and movement of the focus lens constituting the lens unit 11 are performed.

The timing generator 22 supplies a timing signal to the image capturing device 12 under the control of the CPU 23. In accordance with the timing signal, an exposure time of the image capturing device 12 and the like are controlled. The image capturing device 12 operates in accordance with the timing signal supplied from the timing generator 22. Thus, the image capturing device 12 receives light from the subject incident through the lens unit 11 to perform photoelectric conversion, and supplies an analog image signal, which serves as an electric signal corresponding to the amount of received light, to the analog-signal processor 13. The analog-signal processor 13 performs analog-signal processing (including amplification) on the analog image signal transmitted from the image capturing device 12, and supplies the obtained image signal to the A/D converter 14, under the control of the CPU 23.

Then, the A/D converter 14 performs A/D conversion of the analog image signal transmitted from the analog-signal processor 13, and supplies the obtained digital image data to the digital-signal processor 15, under the control of the CPU 23. The digital-signal processor 15 performs digital-signal processing, such as noise removal processing, on the digital image signal transmitted from the A/D converter 14, and supplies the obtained image signal to the liquid crystal panel 17 so that the image signal is displayed on the liquid crystal panel 17, under the control of the CPU 23.

The digital-signal processor 15 compresses, in accordance with, for example, a joint photographic experts group (JPEG) method, the digital image signal transmitted from the A/D converter 14, and supplies the obtained compressed digital image signal to the recording device 19 so that the image signal is recorded in the recording device 19.

Moreover, the digital-signal processor 15 decompresses the compressed image data recorded in the recording device 19, and supplies the obtained image data to the liquid crystal panel 17 so that the image data is displayed on the liquid crystal panel 17. That is, the digital-signal processor 15 supplies to the liquid crystal panel 17 the image data transmitted from the A/D converter 14, and a so-called through image is displayed on the liquid crystal panel 17. Furthermore, the digital-signal processor 15 generates an image of a focus frame (AF frame) to be used for focus control, and supplies the generated image to the liquid crystal panel 17 so that the image is displayed on the liquid crystal panel 17, under the control of the CPU 23.

Then, when the user presses a shutter button, which is conceptually contained in the operation unit 24, the operation unit 24 supplies a release signal to the CPU 23. When the release signal is supplied to the CPU 23 as described above, the CPU 23 controls the digital-signal processor 15 to compress the image data supplied from the A/D converter 14 to the digital-signal processor 15 and to record the compressed image data in the recording device 19.

The image capturing apparatus has an AF function. The image capturing apparatus according to this embodiment sets an AF frame in an image captured by the image capturing device 12, and performs focus control on the basis of the image inside the AF frame. With the AF function, the AF frame can be set in a desired position in the image displayed on the liquid crystal panel 17. Furthermore, only by an operation for the touch panel 16 that is formed integrally with the liquid crystal panel 17, the position, size, and the like of the AF frame can be controlled. AF processing is implemented when the CPU 23 reads and executes a program stored in the program ROM 26. The image capturing apparatus also has an AE function and an AWB function. The AE function and the AWB function are also implemented when the CPU 23 reads and executes a program stored in the program ROM 26.

A particular feature is as described below. First, the CPU 23 determines the mode set for the image capturing apparatus. The image capturing apparatus has a manual shooting mode and an automatic shooting mode including a multi-AF mode and a spot-AF mode. In the case that the touch panel 16 is operated and an AF point is selected on the screen, the CPU 23 sets the selected AF point and determines whether a face exists in a rectangular AF frame, which represents an index of the AF point. Then, the CPU 23 changes shooting control on the basis of the result of the determination.

In this embodiment, in the case that a face is detected, the CPU 23 performs shooting control including AF, AE, and AWB. In contrast, in the case that a face is not detected, the CPU 23 performs control such that a spot-AF operation is performed on the set AF point. Accordingly, the control unit 1 performs the above-described shooting control, and then captures an image using the image capturing device 12 in response to depress of a release button, which is conceptually contained in the operation unit 24. Then, after various types of image processing are performed by the analog-signal processor 13, the A/D converter 14, and the digital-signal processor 15, the control unit 1 performs control such that image data based on the captured image is stored in the recording device 19.

As a method for detecting the face of a subject, for example, a method for preparing an average face image in the form of a template in advance and performing matching between a received image and the image contained in the template can be adopted. Thus, the description of the method for detecting the face of a subject will be omitted.

As described above, the image capturing apparatus performs not only face detection but also, in the case that a face is detected, shooting control (AF, AE, and AWB) suitable for image capturing of the detected face. Thus, a high-quality image can be obtained.

Figure 3A:
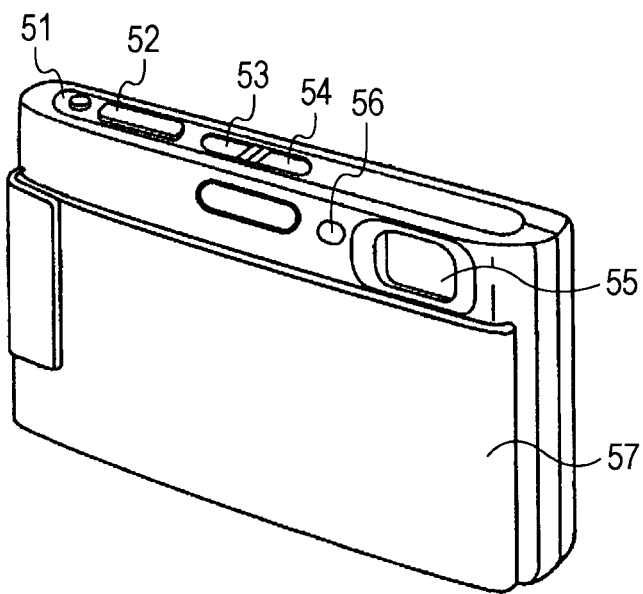
FIG. 3A is a perspective view of the image capturing apparatus according to the second embodiment when viewed from the back side thereof.
Figure 3B:
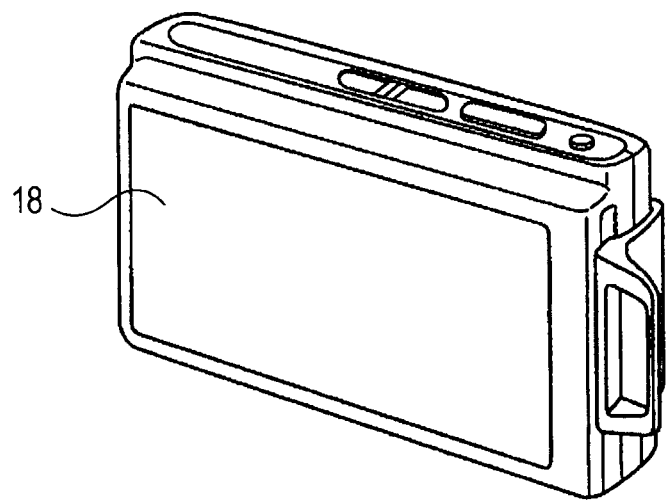
FIG. 3B is a perspective view of the image capturing apparatus according to the second embodiment when viewed from the front side thereof.

FIGS. 3A and 3B schematically show the image capturing apparatus according to the second embodiment.

FIG. 3A is a perspective view of the image capturing apparatus when viewed from the front side thereof, and FIG. 3B is a perspective view of the image capturing apparatus when viewed from the back side thereof.

The front side of the image capturing apparatus is covered with a lens cover 57. When the lens cover 57 on the front side is opened downward, a taking lens 55 and an AF illuminator 56, which are conceptually contained in the lens unit 11, are exposed. The AF illuminator 56 also serves as a self-timer lamp. A zoom lever (TELE/WIDE) 51, a shutter button 52, a play button 53, and a power button 54 are provided on the top side of the image capturing apparatus. The touch screen 18 is provided on the back side of the image capturing apparatus. The zoom lever 51, the shutter button 52, the play button 53, and the power button 54 are conceptually contained in the operation unit 24.

Figure 4:
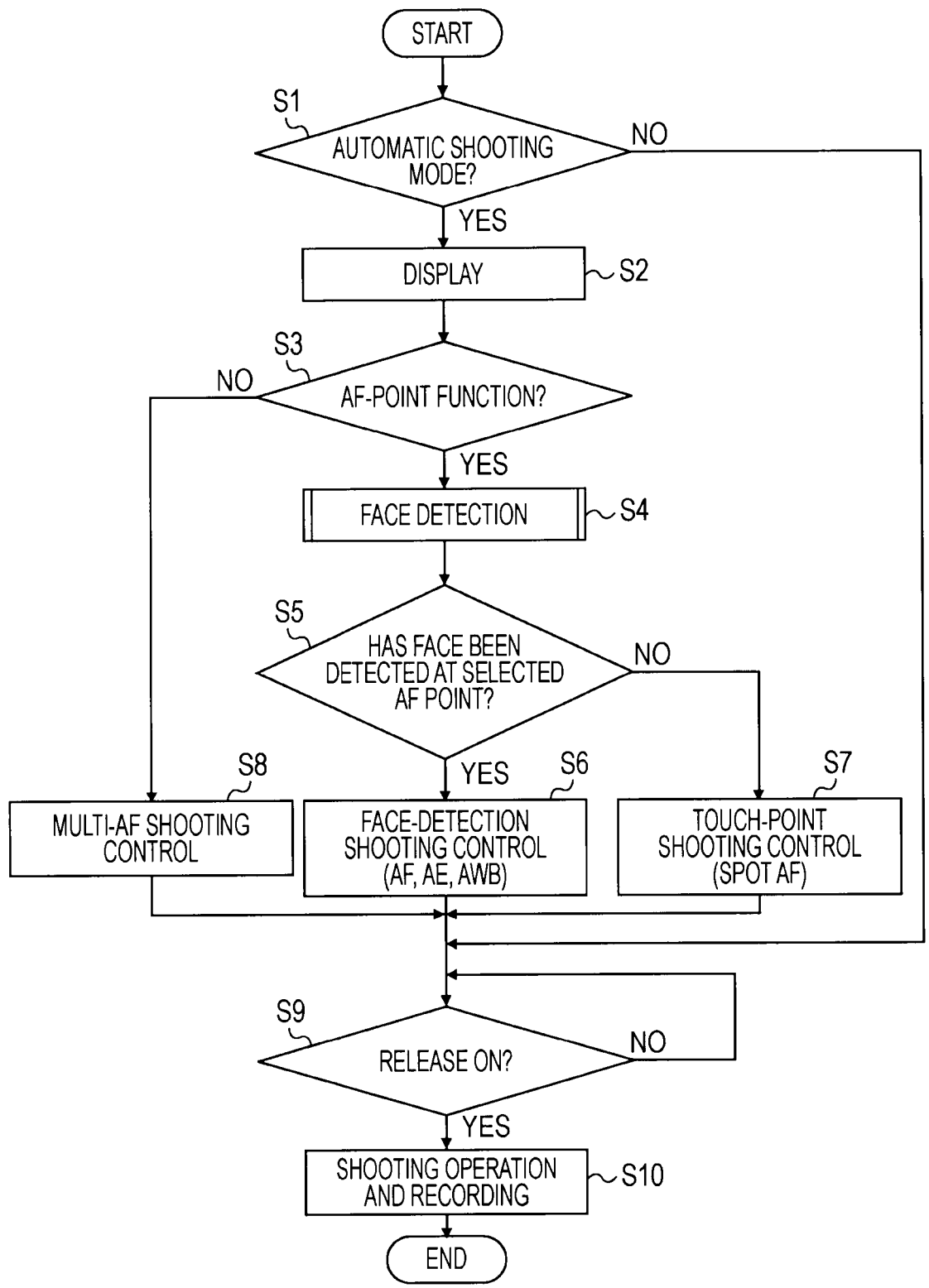
FIG. 4 is a flowchart of a characteristic process to be performed by the image capturing apparatus according to the second embodiment.

A characteristic process to be performed by the image capturing apparatus according to the second embodiment will be described with reference to a flowchart shown in FIG. 4. In the description of the flowchart, FIG. 5 will be referred to when necessary. An example of the process described below also corresponds to an image display method according to the second embodiment.

First, the CPU 23 determines whether an automatic shooting mode is set (step S1). The image capturing apparatus has, for example, the "automatic shooting mode" and a "manual shooting mode". In the case that the image capturing apparatus is set to the automatic shooting mode, the user is able to select a multi-AF mode, a spot-AF mode, or the like.

The "multi-AF mode" is a mode where a plurality of AF points are automatically focused upon. The "spot-AF mode" is a mode where a desired AF point within a specific AF detectable frame can be manually set.

If the CPU 23 determines in step S1 that the automatic shooting mode is not set (that is, if the determination in step S1 is NO), the CPU 23 proceeds to step S9. If the CPU 23 determines in step S1 that the automatic shooting mode is set (that is, if the determination in step S1 is YES), a through image is displayed on the liquid crystal panel 17 (step S2). The state where a through image is displayed is represented as a screen 100 in FIG. 5. FIG. 5 shows a display example in a case where the multi-AF mode is set (initial state). A multi-AF frame 100a is also displayed on the screen 100.

Then, the CPU 23 determines whether a desired position on the touch panel 16 is tapped and an AF point is selected (step S3). If the CPU 23 determines in step S3 that an AF point is not selected (that is, if the determination in step S3 is NO), multi-AF shooting control is performed (step S8). Then, the CPU 23 proceeds to step S9. The multi-AF shooting control is processing for performing auto-focusing or the like on a subject within the multi-AF frame 100a.

If the CPU 23 determines that a desired position on the touch panel 16 is tapped and an AF point is selected (that is, if the determination in step S3 is YES), the CPU 23 proceeds to step S4 to perform face detection. Then, the CPU 23 determines whether a face is detected within an AF frame, which is a specific rectangular area centered on the selected AF point (step S5). As a face-detection method, for example, a method for preparing an average face image in the form of a template in advance and performing matching between a received image and the image contained in the template can be adopted. Thus, the description of the face-detection method will be omitted.

If the CPU 23 determines in step S5 that a face is detected at the selected AF point (that is, if the determination in step S5 is YES), the CPU 23 performs face-detection shooting control (that is, all the AF, AE, and AWB processing) (step S6). Then, the CPU 23 proceeds to step S9. If the CPU 23 determines in step S5 that a face is not detected at the selected AF point (that is, if the determination in step S5 is NO), the CPU 23 performs touch-point shooting control (that is, spot-AF processing) (step S7). Then, the CPU 23 proceeds to step S9.

That is, as shown in FIG. 5, in the case that a face is detected at the tapped position or a position near the tapped position on the touch panel 16, a screen 101 is displayed on the liquid crystal panel 17. That is, AF frames 101a to 101c and a selection frame 101d, which is a specific rectangular area centered on the selected AF point, are displayed on the screen 101. In contrast, in the case that a face is not detected at the tapped position or a position near the tapped position on the touch panel 16, a screen 102 is displayed on the liquid crystal panel 17. That is, a selection frame 102a, which is a specific rectangular area centered on the tapped AF point, is displayed on the screen 102. When an off button 101e or 102b is tapped on the screen 101 or 102, the screen 100, which is to be displayed in the initial state, is displayed.

In the following description, shooting to be performed after multi-AF shooting control is performed is referred to as "multi-AF shooting", shooting to be performed after face-detection shooting control is performed is referred to as "face-detection shooting", and shooting to be performed after touch-point shooting control is performed is referred to as "touch-point shooting".

The CPU 23 determines whether the shutter button 52, which is conceptually contained in the operation unit 24, is pressed (that is, shutter release is turned on) (step S9). If the CPU 23 determines in step S9 that the shutter button 52 is pressed (that is, if the determination in step S9 is YES), the CPU 23 performs a shooting operation, various types of image processing for an image signal obtained by image capturing, and records the image data in the recording device 19 (step S10). Then, the process is terminated.

That is, more specifically, as shown in FIG. 5, in the case of "multi-AF shooting", when the shutter button 52 is half-pressed, multi AF is locked. The state where multi AF is locked is shown as a screen 103 in FIG. 5. Locked AF frames 103a and 103b are displayed on the screen 103. Then, when the shutter button 52 is fully pressed, image capturing is performed. Then, image data that has been subjected to various types of image processing is recorded in the recording device 19.

In the case of "face-detection shooting", when the shutter button 52 is half-pressed in a state where the screen 101 is displayed on the liquid crystal panel 17, face AF is locked. The state where face AF is locked is shown as a screen 104 in FIG. 5. Locked AF frames 104a and 104b and a locked selection frame 104c are displayed on the screen 104. Then, when the shutter button 52 is fully pressed, image capturing is performed. Then, image data that has been subjected to various types of image processing is recorded in the recording device 19.

In the case of "touch-point shooting", when the shutter button 52 is half-pressed in a state where the screen 102 is displayed on the liquid crystal panel 17, touch-point AF is locked. The state where touch-point AF is locked is shown as a screen 105 in FIG. 5. A locked selection frame 105a is displayed on the screen 105. Then, when the shutter button 52 is fully pressed, image capturing is performed. Then, image data that has been subjected to various types of image processing is recorded in the recording device 19.

The image capturing apparatus according to the second embodiment is also capable of detecting face movement, detecting a new face, and selecting a new face. Such processing will be described with reference to FIG. 6.

In a state where a screen 200 is displayed on the liquid crystal panel 17, AF frames 200a and 200b and a selection frame 200c are displayed on the screen 200. In this state (a state before AF is locked), in the case that, as shown in a screen 201, the position of the face of a subject within an AF frame 201b (a selection frame 201c) moves, the CPU 23 detects the movement of the face of the subject. Then, as shown in a screen 202, AF frames 202a and 202b and a selection frame 202c are displayed in positions corresponding to positions after the faces move. That is, the CPU 23 is capable of not only performing face detection but also detecting movement of faces and displaying AF frames and a selection frame in appropriate positions (face positions) while tracking the movement of the faces.

In addition, in the state where the screen 200 is displayed (the state before AF is locked), in the case that, as shown in a screen 203, a new face is detected in a region (represented as a region 203d in FIG. 6) outside an area containing AF frames 203a and 203b and a selection frame 203c, the CPU 23 detects the new face. Then, as shown in a screen 204, an AF frame 204d, which contains the detected new face, as well as AF frames 204a and 204b and a selection frame 204c, are displayed. That is, the CPU 23 is capable of not only performing face detection but also detecting a new face and displaying AF frames for all the detected faces.

In addition, in the state where the screen 200 is displayed (the state before AF is locked), in a case where, as shown in a screen 205, AF frames 205a and 205b and a selection frame 205c are displayed, when the AF frame 205a is tapped, the CPU 23 detects that the AF frame 205a is tapped. Then, as shown in a screen 206, a selection frame 206c is displayed in an AF frame 206a, and a selection frame is not displayed in an AF frame 206b. That is, the CPU 23 is also capable of changing the position of a selection frame on the basis of a signal from the touch panel 16 in accordance with an instruction from the user even after face detection is performed.

In the case that a plurality of faces are detected, the top priority may be given to the face of a subject selected in accordance with an instruction from the user using the touch panel 16. Then, a face near the selected face or a face, the distance between the face and the image capturing apparatus being the same as the distance between the selected face and the image capturing apparatus, may be treated preferentially. In accordance with the set order of priority, AF frames may be set for a predetermined number of faces. In addition, in the case that selection is not particularly performed by the user, AF frames for a predetermined number of faces may be set in accordance with the order of priority, for example, set by giving the priority to a face near the center of the screen or giving the priority to a face having a large face area.

As described above, according to the first and second embodiments of the present invention, in a case where the image capturing apparatus is set to the automatic shooting mode, if a desired position is designated as an AF point in accordance with an instruction from a user using the touch panel, it is determined whether the face of a subject exists within an AF frame defined based on the AF point. If it is determined that the face of a subject exists within the AF frame, the image capturing apparatus performs all the AF, AE, and AWB processing. If it is determined that the face of a subject does not exist within the AF frame, the image capturing apparatus performs a spot-AF operation. Accordingly, an image capturing apparatus, an image display control method, and a program capable of obtaining a high-quality captured image by changing shooting control on the basis of the result of face detection can be provided.

Although the embodiments of the present invention have been described above, the present invention is not limited to any of the above-described embodiments. Various improvements and modifications can be made to the present invention without departing from the spirit and scope of the present invention.

For example, although an example in which shooting control is changed on the basis of a result of face detection has been described in each of the above-described embodiments, obviously, shooting control using a result of smile detection may also be performed. In addition, in a case where continuous shooting is performed, obviously, setting may be automatically performed, using a predetermined table, such that a subject to which the high priority is given in the initial shooting can be treated preferentially in the next shooting.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing apparatus comprising:
   image capturing means for capturing an image to obtain an image signal;
   display means for displaying an image based on the image signal;
   instruction-receiving means for receiving a user-selected position of an auto-focus point on the displayed image; and
   control means for determining whether a face of a subject is located at the user-selected position of the auto-focus point, the control means selecting one of face-detection shooting control including auto-focus, auto-exposure, and auto-white-balance for the face of the subject located at the user-selected position of the auto-focus point and touch-point shooting control including spot auto-focusing on the user-selected position of the auto-focus point, the selection being based on whether the face of the subject is located at the user-selected position of the auto-focus point, wherein
   the control means controls the display means to display a first frame centered on the user-selected position of the auto-focus point overlaid on the image, and
   the control means controls the display means to display a second frame around the face, in the image with the first frame, in response to a determination that the face of the subject is located at the user-selected position of the auto-focus point.

2. The image capturing apparatus according to claim 1, wherein even after determining whether the face of the subject is located at the user-selected position of the auto-focus point, the control means continues to detect the position of the face and whether a new face is present.

3. The image capturing apparatus according to claim 1, wherein the user-selected position of the auto-focus point is changed in accordance with an instruction received by the instruction-receiving means even after determining whether the face of the subject is located at the user-selected position of the auto-focus point.

4. The image capturing apparatus according to claim 1, wherein the control means selects the face-detection shooting control in response to the determination that the face of the subject is located at the user-selected position of the auto-focus point and selects the touch-point shooting control in response to a determination that the face of the subject is not located at the user-selected position of the auto-focus point.

5. A shooting control method comprising:
   capturing an image to obtain an image signal;
   determining whether a specific mode is set;

receiving an instruction for designating a user-selected position of an auto-focus point on the captured image;

displaying a first frame centered on the user-selected position of the auto-focus point overlaid on the captured image;

determining whether a face of a subject is located at the user-selected position of the auto-focus point;

displaying a second frame around the face, in the captured image with the first frame, in response to a determination that the face of the subject is located at the user-selected position of the auto-focus point; and selecting one of face-detection shooting control including auto-focus, auto-exposure, and auto-white-balance for the face of the subject located at the user-selected position of the auto-focus point and touch-point shooting control including spot auto-focusing on the user-selected position of the auto-focus point, the selection being based on whether the face of the subject is located at the user-selected position of the auto-focus point.

6. The shooting control method according to claim 5, wherein the selecting includes selecting the face-detection shooting control in response to the determination that the face of the subject is located at the user-selected position of the auto-focus point and selecting the touch-point shooting control in response to a determination that the face of the subject is not located at the user-selected position of the auto-focus point.

7. A non-transitory computer-readable storage medium storing computer-readable instructions thereon, the computer-readable instructions, when executed by a computer, cause a computer to perform a method comprising:

setting an auto-focus point in accordance with an instruction designating a user-selected position of an auto-focus point on a captured image;

displaying a first frame centered on the user-selected position of the auto-focus point overlaid on the captured image;

determining whether a face of a subject is located at the set user-selected position of the auto-focus point;

displaying a second frame around the face, in the captured image with the first frame, in response to a determination that the face of the subject is located at the user-selected position of the auto-focus point; and selecting one of face-detection shooting control including auto-focus, auto-exposure, and auto-white-balance for the face of the subject located at the user-selected position of the auto-focus point and touch-point shooting control including spot auto-focusing on the user-selected position of the auto-focus point, the selection being made on the basis of a result of the determination.

8. A non-transitory computer-readable storage medium according to claim 7, wherein the selecting includes selecting the face-detection shooting control in response to the determination that the face of the subject is located at the user-selected position of the auto-focus point and selecting the touch-point shooting control in response to a determination that the face of the subject is not located at the user-selected position of the auto-focus point.

9. An image capturing apparatus comprising:

circuitry configured to:

capture an image to obtain an image signal;

display an image based on the image signal;

receive a user-selected position of an auto-focus point on the displayed image;

display a first frame centered on the user-selected position of the auto-focus point overlaid on the image;

determine whether a face of a subject is located at the user-selected position of the auto-focus point;

display a second frame around the face, in the image with the first frame, in response to a determination that the face of the subject is located at the user-selected position of the auto-focus point; and select one of face-detection shooting control including auto-focus, auto-exposure, and auto-white-balance for the face of the subject located at the user-selected position of the auto-focus point and touch-point shooting control including spot auto-focusing focusing on the user-selected position of the auto-focus point, the selection being based on whether the face of the subject is located at the user-selected position of the auto-focus point.

10. The image capturing apparatus according to claim 9, wherein spot auto-focusing is performed on the captured image using the user-selected position of the auto-focus point when the face of the subject is not located at the user-selected position of the auto-focus point.

11. The image capturing apparatus according to claim 9, further comprising a touch panel configured to receive input by detecting the coordinates of a touched position on the displayed image as the user-selected position of the auto-focus point.

12. The image capturing apparatus according to claim 9, wherein the circuitry is configured to determine whether the face of the subject is located in the first frame.

13. The image capturing apparatus according to claim 9, further comprising a liquid crystal panel that displays the image, the first frame, and the second frame.

14. The image capturing apparatus according to claim 9, the image capturing apparatus operating in a user-selected mode, the user-selected mode being one of a manual shooting mode, an automatic shooting mode with multi-auto-focus, and an automatic shooting mode with spot auto-focus.

15. The image capturing apparatus according to claim 9, wherein the circuitry is configured to select the face-detection shooting control in response to the determination that the face of the subject is located at the user-selected position of the auto-focus point and select the touch-point shooting control in response to a determination that the face of the subject is not located at the user-selected position of the auto-focus point.

* * * * *